US012802431B2

(12) United States Patent
Zhou et al.

(10) Patent No.: US 12,802,431 B2
(45) Date of Patent: Nov. 17, 2026

(54) SYSTEMS AND METHODS FOR COMPLETING PARAMETER DATA USING GRAPHING AND A DENOISING MODEL

(71) Applicant: Toyota Research Institute, Inc., Los Altos, CA (US)

(72) Inventors: Rui Zhou, Cambridge, MA (US); Chenyang Yuan, Cambridge, MA (US); Frank Permenter, Cambridge, MA (US); Yanxia Zhang, Foster City, CA (US); Nikos Arechiga Gonzalez, San Mateo, CA (US); Matthew Evans Klenk, San Francisco, CA (US); Faez Ahmed, Winchester, MA (US)

(73) Assignees: Toyota Research Institute, Inc., Los Altos, CA (US); Toyota Jidosha Kabushiki Kaisha, Toyota (JP); Massachusetts Institute of Technology, Cambridge, MA (US)

( * ) Notice: Subject to any disclaimer, the term of this patent is extended or adjusted under 35 U.S.C. 154(b) by 163 days.

(21) Appl. No.: 18/785,575

(22) Filed: Jul. 26, 2024

(65) Prior Publication Data

US 2025/0349115 A1 Nov. 13, 2025

Related U.S. Application Data

(60) Provisional application No. 63/644,828, filed on May 9, 2024.

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC ........................... G06V 10/82; G06V 10/7715
See application file for complete search history.

(56) References Cited

U.S. PATENT DOCUMENTS 11,636,347 B2 * 4/2023 Dai .................... G06F 18/2148 706/25
2019/0347523 A1 * 11/2019 Rothberg ............ G06F 18/2155
(Continued)

FOREIGN PATENT DOCUMENTS

CN 110675316 A 1/2020
CN 112241478 A 1/2021
(Continued)

OTHER PUBLICATIONS

Said et al., 2023, "Circuit design completion using graph neural networks" (pp. 12145-12157) (Year: 2023).*
(Continued)

*Primary Examiner* — Manav Seth
(74) *Attorney, Agent, or Firm* — Christopher G. Darrow; Darrow Mustafa PC

(57) ABSTRACT

Systems, methods, and other embodiments described herein relate to automatically completing parameter data that is missing when executing a computing task through a learning model that is graph-based and a denoising model using diffusion. In one embodiment, a method includes constructing a parameter graph from an assembly graph and partial parameters associated with an object. The method also includes generating a graph embedding from encoding the parameter graph using a learning model. The method also includes estimating a conditional embedding of the graph embedding and the assembly graph using a cross-attention model. The method also includes outputting completed
(Continued)

parameters with the conditional embedding using a denoising model and completing the object with the completed parameters.

20 Claims, 6 Drawing Sheets

(56) References Cited

U.S. PATENT DOCUMENTS

| | | | | |
|---|---|---|---|---|
| 2024/0127909 | A1 * | 4/2024 | Pai | G06N 20/00 |
| 2024/0273733 | A1 * | 8/2024 | Nguyen | G06T 7/292 |
| 2026/0133051 | A1 * | 5/2026 | Haskin | G01C 21/3852 |
| 2026/0141299 | A1 * | 5/2026 | Rampini | G06N 20/00 |

FOREIGN PATENT DOCUMENTS

| | | | | | |
|---|---|---|---|---|---|
| CN | 112991350 A | | 6/2021 | |
| CN | 113361251 A | | 9/2021 | |
| CN | 115100565 A | * | 9/2022 | G06V 20/41 |
| CN | 115131698 A | * | 9/2022 | G06V 20/46 |
| CN | 115456058 A | | 12/2022 | |
| CN | 115471755 A | * | 12/2022 | G06N 3/08 |
| CN | 111476306 B | * | 7/2023 | G06N 3/09 |
| CN | 116740418 A | * | 9/2023 | G06V 10/765 |
| CN | 116883528 A | | 10/2023 | |
| CN | 117315430 A | | 12/2023 | |
| CN | 117372474 A | | 1/2024 | |
| CN | 117609553 A | | 2/2024 | |
| WO | WO-2020152233 A1 | * | 7/2020 | G06N 3/006 |

OTHER PUBLICATIONS

Huang et al., 2020, "Generative 3D Part Assembly via dynamic Graph Learning" (pp. 1-12) (Year: 2020).*
Shi et al., 2023, "RoboCraft: Learning to see, simulate, and shape elasto-plastic objects in 3D with graph networks" (pp. 533-549) (Year: 2023).*
Rossi et al, 2022, "Graph machine learning with missing node features" (pp. 1-7) (Year: 2022).*
Shi et al., 2020, "Point-GNN: Graph Neural Network for 3D object Detection in a point cloud" (pp. 1711-1719) (Year: 2020).*
Rombach et al., "High-resolution image synthesis with latent diffusion models," Proceedings of the IEEE/CVF Conference on Computer Vision and Pattern Recognition (CVPR), 2022, pp. 10684-10695.
Zhang et al., "Adding conditional control to text-to-image diffusion models," Proceedings of the IEEE/CVF International Conference on Computer Vision (ICCV), 2023, pp. 3836-3847.
Hu et al., "Cocktail: Mixing Multi-Modality Controls for Text-Conditional Image Generation," 37th Annual Conference on Neural Information Processing Systems, 2023, pp. 1-21.
Feng et al., "Can Text-to-image Model Assist Multi-modal Learning for Visual Recognition with Visual Modality Missing?" arXiv:2402.09036, Feb. 2024, pp. 1-20.
Conradie et al., "Modal reduction principles: a parametric shift to graphs," Journal of Applied Non-Classical Logics, vol. 34, issue 2-3, 2024, pp. 175-222.
Liu et al., "Jointly Cross- and Self-Modal Graph Attention Network for Query-Based Moment Localization," MM '20: Proceedings of the 28th ACM International Conference on Multimedia, Oct. 2020, pp. 4070-4078.
Tang et al., "Generative-based Fusion Mechanism for Multi-Modal Tracking," Proceedings of the AAAI Conference on Artificial Intelligence, vol. 38, No. 6, Mar. 24, 2024, pp. 5189-5197.
Lin et al., "Missing value imputation: a review and analysis of the literature (2006-2017)" Artificial Intelligence Review, 53, 2020, pp. 1487-1509.
Little et al., "Statistical analysis with missing data," vol. 793, John Wiley & Sons, 2019, 7 pages.
Joseph L. Schafer, "Analysis of incomplete multivariate data," CRC press, 1997, 417 pages.
Troyanskaya et al., Missing value estimation methods for dna microarrays, Bioinformatics, 17(6), 2001, pp. 520-525.
Stekhoven et al., "Missforest—nonparametric missing value imputation for mixed-type data," Bioinformatics, 28(1), 2012, pp. 112-118.
Mazumder et al., "Spectral regularization algorithms for learning large incomplete matrices," The Journal of Machine Learning Research, 11, 2010, pp. 2287-2322.
Goodfellow et al., "Generative adversarial networks," Communications of the ACM, 63(11), 2020, pp. 139-144.
Kingma et al., "Auto-encoding variational bayes," arXiv preprint arXiv:1312.6114, 2013, pp. 1-14.
Gondara et al., "MIDA: Multiple Imputation Using Denoising Autoencoders," In Advances in Knowledge Discovery and Data Mining: 22nd Pacific-Asia Conference, PAKDD 2018, Melbourne, VIC, Australia, Proceedings, Part III, 22, pp. 260-272.
Chen et al., "Traffic flow imputation using parallel data and generative adversarial networks," IEEE Transactions on Intelligent Transportation Systems, 21(4), pp. 1624-1630.
Yoon et al., "Gain: Missing data imputation using generative adversarial nets," In International conference on machine learning, 2018, pp. 5689-5698.
Fortuin et al., "Gp-vae: Deep probabilistic time series imputation," In International conference on artificial intelligence and statistics, PMLR, 2020, pp. 1651-1661.
Zhu et al., "Biologically inspired design concept generation using generative pre-trained transformers," Journal of Mechanical Design, 145(4):041409, 2023, pp. 1-23.
Raina et al., "Learning to Design Without Prior Data: Discovering Generalizable Design Strategies Using Deep Learning and Tree Search," Journal of Mechanical Design, 145(3):031402, 12, 2022, pp. 1-39.
Song et al., "Attention-enhanced multimodal learning for conceptual design evaluations," Journal of Mechanical Design, 145(4):041410, 2023.
Ho et al., "Denoising diffusion probabilistic models," Advances in neural information processing systems, 33, 2020, pp. 6840-6851.
Tashiro et al., "Csdi: Conditional score-based diffusion models for probabilistic time series imputation," Advances in Neural Information Processing Systems, 34, 2021, pp. 24804-24816.
Zheng et al., "Diffusion models for missing value imputation in tabular data," arXiv preprint arXiv:2210.17128, 2022, pp. 1-7.
Scarselli et al., "The graph neural network model," IEEE transactions on neural networks, 20(1), 2008, pp. 61-80.
Kipf et al., "Semi-supervised classification with graph convolutional networks," arXiv preprint arXiv: 1609.02907, 2016, pp. 1-14.
Spinelli et al., "Missing data imputation with adversarially-trained graph convolutional networks," Neural Networks, 129, 2020, pp. 249-260.
You et al., "Handling missing data with graph representation learning," Advances in Neural Information Processing Systems, 33, 2020, pp. 19075-19087.
Regenwetter et al., "Beyond statistical similarity: Rethinking metrics for deep generative models in engineering design," Computer-Aided Design, 165:103609, 2023, pp. 1-51.
Regenwetter et al., BIKED: A Dataset for Computational Bicycle Design With Machine Learning Benchmarks, Journal of Mechanical Design, 144(3), 10 2021, pp. 1-19.
Marie Reilly, "Data analysis using hot deck multiple imputation," Journal of the Royal Statistical Society: Series D (The Statistician), 42(3), 1993, pp. 307-313.
Qu et al., "Ppca-based missing data imputation for traffic flow volume: A systematical approach," IEEE Transactions on intelligent transportation systems, 10(3), 2009, pp. 512-522.

* cited by examiner

SYSTEMS AND METHODS FOR COMPLETING PARAMETER DATA USING GRAPHING AND A DENOISING MODEL

CROSS-REFERENCE TO RELATED APPLICATIONS

This application claims the benefit of U.S. Provisional Application No. 63/644,828, filed on May 9, 2024, which is herein incorporated by reference in its entirety.

TECHNICAL FIELD

The subject matter described herein relates, in general, to completing parameter data using generative models, and, more particularly, to completing parameter data that is missing from a computing task using graphing and a denoising model.

BACKGROUND

Learning models that generate data have applications for automation, design, and product development. For example, systems generate unique responses and converse through a learning model processing textual inputs associated with a digital assistant. However, these systems may generate new content rather than addressing data that is incomplete, missing, etc., for an application. Incomplete datasets are an obstacle encountered across various domains, such as engineering from design iterations, data transmission errors, measurement unavailability at a design stage, etc. As such, design applications face difficulties when having missing data and gaps using learning models that are generative.

In various implementations, systems imputing missing data with a learning model can oversimplify parameter complexity, misjudge parameter interrelatedness, etc., that impact output accuracy. These situations can also lead to generating erroneous results. Furthermore, the systems can lack design alternatives and improvements over iterations having missing data from inputted prompts when generating an object, object parts, etc. In other words, the systems can be a passive rather than an active tool and lack collaborative features during a design. Therefore, systems imputing missing parameters using a learning model can exhibit limited creativity and inaccurate outputs, thereby decreasing performance.

SUMMARY

In one embodiment, example systems and methods relate to automatically completing parameter data that is missing when executing a computing task through a learning model that is graph-based and a denoising model using diffusion. In various implementations, systems imputing parameters using a learning model have design outputs and recommendations with limited design diversity. These systems can operate this way from having design spaces without comprehensive awareness about data relationships. In particular, systems imputing data can underutilize rich sources of structural information caused by missing data that impacts ideation and other computing tasks demanding critical parameters. Thus, systems imputing data have features that inhibit computing tasks demanding certain parameters and decrease data exploration.

Therefore, in one embodiment, an estimation system employs a learning model that encodes an assembly graph about an object and a denoising model that automatically completes partial parameters describing the object through generative computations. Here, the assembly graph includes details about the hierarchical and spatial relationships among various components of the object. In this way, the estimation system fully utilizes a rich source of structural information. In one approach, the learning model is a graph neural network (GNN) that derives a graph embedding from feature encoding the assembly graph and the partial parameters (e.g., color, shape, etc.). Furthermore, in one approach, the learning model allows the estimation system to capture nuanced interdependencies between the partial parameters and contextual awareness. A cross-attention model can generate a conditional embedding that is multi-modal using the graph embedding and embeddings computed from the assembly graph.

In one embodiment, a conditional computation involves controlling an operation through adding another variable, parameter, etc. In another approach, the denoising model executes diffusion tasks that generate various forms of the object for improving iterations when modifying the partial parameters. For example, the denoising model injects noise and extracts features through denoising that autocompletes the partial parameters. Accordingly, the estimation system supplies broader exploration and possibilities involving the partial parameters that enhance and improve generative completion.

In one embodiment, an estimation system that automatically completes parameter data that is missing when executing a computing task through a learning model that is graph-based and a denoising model using diffusion is disclosed. The estimation system includes a memory storing instructions that, when executed by a processor, cause the processor to construct a parameter graph from an assembly graph and partial parameters associated with an object. The instructions also include instructions to generate a graph embedding from encoding the parameter graph using a learning model. The instructions also include instructions to estimate a conditional embedding of the graph embedding and the assembly graph using a cross-attention model. The instructions also include instructions to output completed parameters with the conditional embedding using a denoising model and completing the object with the completed parameters.

In one embodiment, a non-transitory computer-readable medium for automatically completing parameter data that is missing when executing a computing task through a learning model that is graph-based and a denoising model using diffusion and including instructions that when executed by a processor cause the processor to perform one or more functions is disclosed. The instructions include instructions to construct a parameter graph from an assembly graph and partial parameters associated with an object. The instructions also include instructions to generate a graph embedding from encoding the parameter graph using a learning model. The instructions also include instructions to estimate a conditional embedding of the graph embedding and the assembly graph using a cross-attention model. The instructions also include instructions to output completed parameters with the conditional embedding using a denoising model and completing the object with the completed parameters.

In one embodiment, a method for automatically completing parameter data that is missing when executing a computing task through a learning model that is graph-based and a denoising model using diffusion is disclosed. In one embodiment, the method includes constructing a parameter graph from an assembly graph and partial parameters associated with an object. The method also includes generating a graph embedding from encoding the parameter graph using a learning model. The method also includes estimating a conditional embedding of the graph embedding and the assembly graph using a cross-attention model. The method also includes outputting completed parameters with the conditional embedding using a denoising model and completing the object with the completed parameters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
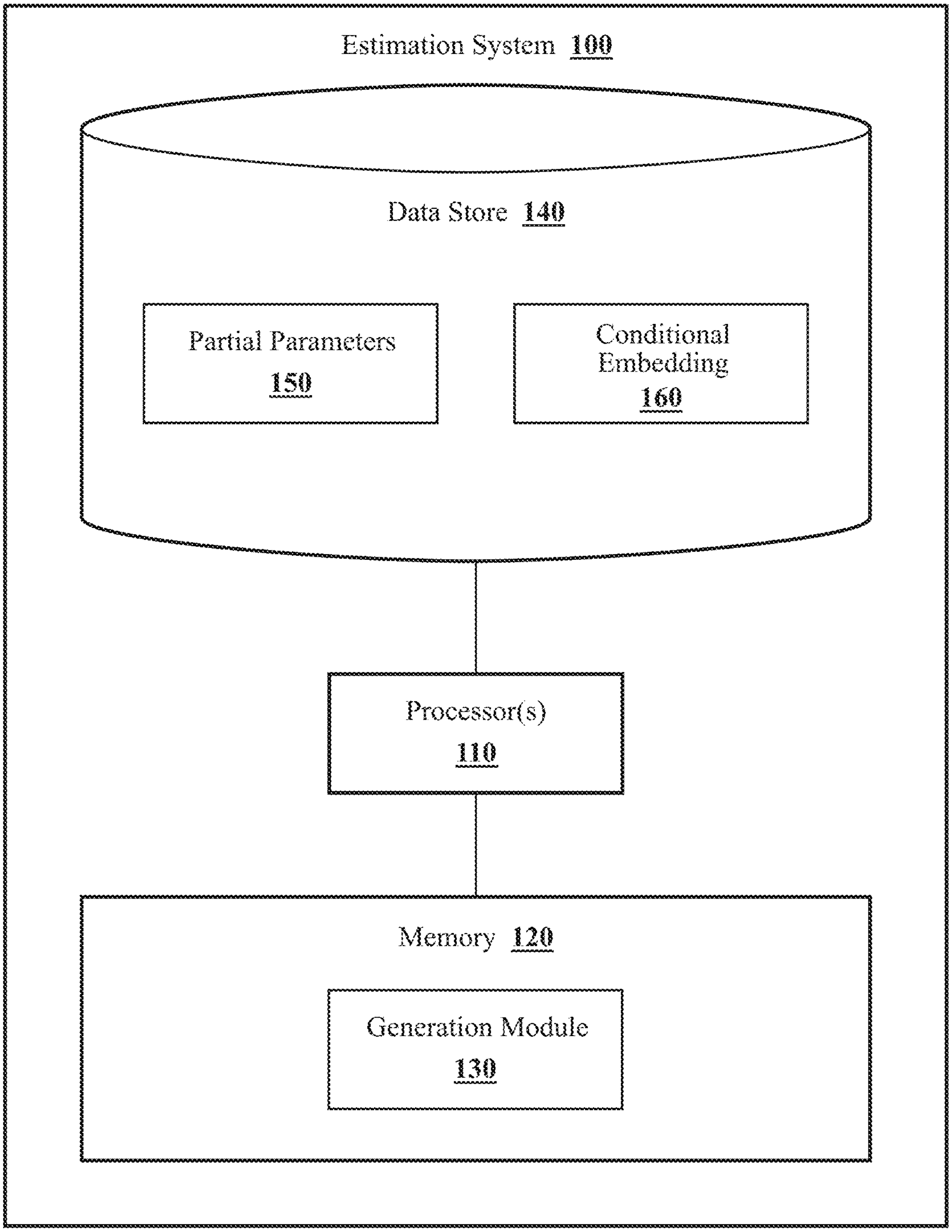
FIG. 1 illustrates one embodiment of an estimation system that is associated with completing parameter data that is missing using graphing and a denoising model.

Systems, methods, and other embodiments associated with automatically completing parameter data that is missing when executing a computing task through a learning model that is graph-based and a denoising model are disclosed herein. In various implementations, systems imputing parameter data for completing a computing task generate inaccurate and constrained outputs. For example, regression-based imputation that predicts missing values for parameters inadequately handles non-linearities and complex interactions between features about an object. Learning models predicting parameters within dimensional spaces that are reduced may incorrectly assume that data is missing at random. Particularly, this observation occurs for predictions involving complex datasets. Regarding deep learning, these models operate with data distributions within increased dimensional spaces capturing intricate dependencies that are unobvious when completing missing data. Furthermore, generative adversarial networks (GANs) and variational autoencoders (VAEs) can impute missing parameters having non-linear relationships. However, learning models completing parameters can incur increased computational costs and iterations. Therefore, systems generating completed data from incomplete parameters face difficulties from non-linearities between features and computational costs that hamper object generation.

Therefore, in one embodiment, an estimation system models relationships between partial parameters inputted (e.g., text prompt, image, etc.) about an object using a learning model that is graph-based and denoises embeddings derived from the partial parameters and an assembly graph for generative completion. Here, the learning model can accurately capture and impute parametric interdependencies that are complex from an assembly graph, thereby providing structural insights about an object, object parts, etc. In one approach, a forward-diffusion operation injects noise within a tabular framework for a conditional embedding outputted by a cross-attention model. A conditional computation can involve controlling and directing diffusion through adding supplemental variables, such as the partial parameters. Furthermore, a denoising model automatically completes the partial parameters (e.g., type, category, size, shape, etc.) having missing data, data gaps, etc., through incorporating a parameter hierarchy from the assembly graph. This can increase imputation accuracy and diversity for missing parameters. In this way, the denoising model can complete parameters that are continuous variables, categorical variables, etc. Thus, the estimation system can output various alternatives and recommendations for automatically completing parameters associated with an object through the denoising model that increases diversity.

Moreover, in one approach, the estimation system implements a learning model (e.g., a graph neural network (GNN), a graph convolutional network (GCN), etc.) that generates a graph embedding from encoding a parameter graph constructed with the partial parameters. Furthermore, the estimation system can predict a conditional embedding of the graph embedding and the assembly graph using the cross-attention model. As previously explained, a conditional computation can involve controlling and directing diffusion through adding supplemental variables, such as the partial parameters. Additionally, a feature tokenizer may derive a parametric embedding from the assembly graph that is fed to the cross-attention model for simplifying computations by organizing and parsing the assembly graph. A positional encoder can also compute a positional embedding from the assembly graph that provides relational context for the cross-attention model. For example, the positional embedding includes positional information of features within the object such that the features positioned closely together include related information.

In one embodiment, the cross-attention model fuses the graph embedding, the parametric embedding, and the positional embedding with increased performance through completing relevant areas of the partial data while ignoring irrelevant areas that lead to erroneous inferences. This also improves accuracy and options variety for completing the object by the denoising model. Accordingly, the estimation system can autocomplete partial parameters prompted about an object using derived embeddings from graphing, cross-attention modeling, and diffusion-based denoising that improves ideation quality and realization times.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

With reference to FIG. 1, one embodiment of an estimation system 100 is illustrated. In particular, FIG. 1 illustrates the estimation system 100 can be associated with completing parameter data that is missing using graphing and a denoising model. The estimation system 100 is shown as including a processor(s) 110 and a memory 120 that stores a generation module 130. The estimation system 100 may be an abstracted form having instructions executed by the processor(s) 110. The memory 120 is a random-access memory (RAM), a read-only memory (ROM), a hard-disk drive, a flash memory, or other suitable memory for storing the generation module 130. The generation module 130 is, for example, computer-readable instructions that when executed by the processor(s) 110 cause the processor(s) 110 to perform the various functions disclosed herein.

Moreover, in one embodiment, the estimation system 100 includes a data store 140. In one embodiment, the data store 140 is a database. The database is, in one embodiment, an electronic data structure stored in the memory 120 or another data store and that is configured with routines that can be executed by the processor(s) 110 for analyzing stored data, providing stored data, organizing stored data, and so on. Thus, in one embodiment, the data store 140 stores data used by the generation module 130 in executing various functions. In one embodiment, the data store 140 includes the partial parameters 150 and the conditional embedding 160. For example, the partial parameters 150 describe one of design features and a category about an object during a design task, a computing task, etc. The partial parameters 150 can involve information used for completing the object through generative computing. The conditional embedding 160 may be one of a vector and a number array that represent features about the object. As explained below, the conditional embedding 160 can be a fused output from a cross-attention model of a graph embedding, a parametric embedding, and a positional embedding using the cross-attention model.

Figure 2:
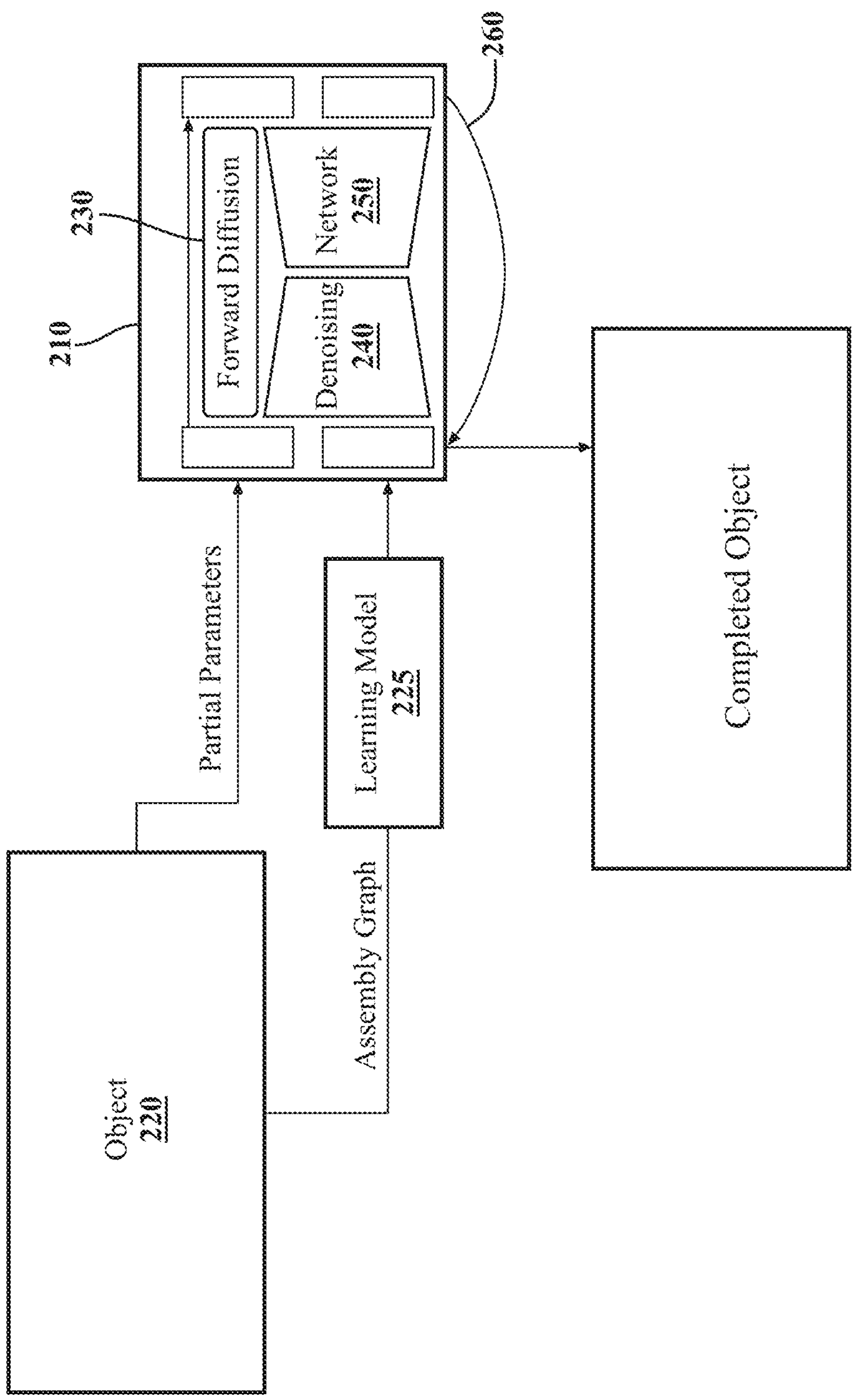
FIG. 2 illustrates one embodiment of a denoising model automatically completing parameter data using partial parameters and an assembly graph describing an object.

Now turning to FIG. 2, one embodiment of a denoising model automatically completing parameter data using partial parameters and an assembly graph describing an object is illustrated. Here, the denoising model 210 receives the partial parameters 150 (e.g., textual prompts) specifying qualities about the object 220. The denoising model 210 also receives a graph embedding derived by the learning model 225 from the assembly graph. Here, the assembly graph can relate components and features about the object 220 in a manner that reduces computations and improves accuracy when completing the partial parameters 150. The assembly graph also can have edges connecting nodes that are structurally related.

Additionally, the denoising model 210 includes a forward-diffusion block 230 that injects noise into the partial parameters 150 and the assembly graph for completing the partial parameters 150. Forward-diffusion can propagate information from a source outward through interconnected nodes, mimicking trend dissemination in a directional manner. Noise can be injected using random perturbations or errors during propagation for simulating real-world uncertainties and trends. A denoising model can learn and train through cleaning data having the injected noise. Furthermore, the denoising model 210 can complete a partial parameter 150 in tabular form through conditional score-based diffusion (CSDI). For example, CSDI is a probabilistic imputation approach that directly learns a conditional distribution and exploits useful information in observed values (i.e., conditional information). CSDI can train using self-supervision, thereby simplifying system complexity.

In FIG. 2, a denoiser 240 extracts features from the noisy partial parameters 150 and the assembly graph. A network 250 decodes outputs from the denoiser 240 for completing the partial parameters 150. A rendering engine can complete the object using completed parameters outputted from the denoising model 210. Furthermore, a feedback loop 260 modifies outputs of the denoising model 210 to refine completed parameters and objects through iteration, such as human feedback. In this way, the denoising model 210 can represent an artificial intelligence (AI) co-pilot that assists a computing task for completing an object from partial parameters such as text through diffusion.

Figure 3:
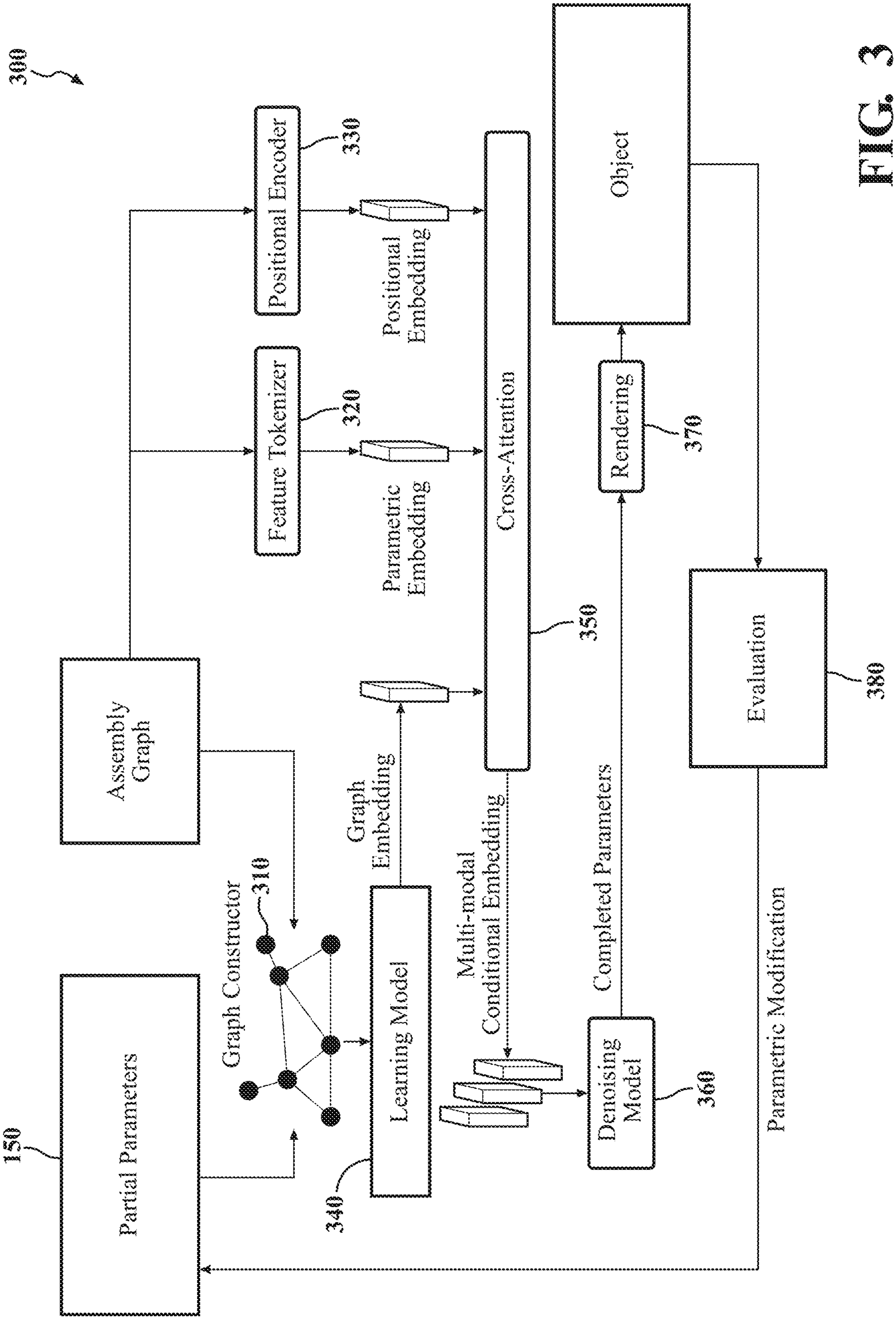
FIG. 3 illustrates one embodiment of the estimation system using a cross-attention model that outputs a conditional embedding that is multi-modal for parameter completion with a denoising model.

Regarding FIG. 3, one embodiment of the estimation system 100 using a cross-attention model that outputs a conditional embedding that is multi-modal for parameter completion with a denoising model is illustrated. In various implementations, the estimation system 100 and/or the generation module 130 includes instructions that cause the processor 110 to construct a parameter graph from an assembly graph and the partial parameters 150 associated with an object. A learning model (e.g., a GNN, a GCN, etc.) can generate a graph embedding from encoding the parameter graph. In one approach, a cross-attention model estimates a conditional embedding of the graph embedding and the assembly graph. Furthermore, completing the partial parameters 150 can involve a denoising model processing the conditional embedding and completing the object with completed parameters.

Moreover, a computing task can request that a completion pipeline 300 impute missing values for the partial parameters 150 associated with an object and generate various object forms. The completion pipeline 300 may implement operations as specified by the estimation system 100. Furthermore, the estimation system 100 and the completion pipeline 300 can be interchangeable for the examples given herein. In one respect, the partial parameters 150 condition various object forms generated by the completion pipeline 300. The partial parameters 150 can also set information in a tabular form for inputting to the completion pipeline 300.

Completing a computing task can involve a request denoted as $X_{complete}=\{x_{1:D}\}\in\mathbb{R}^{D}$ for an object (e.g., a vehicle assembly, a bicycle product, etc.). Here, D is the total number of features for a complete object (e.g., a product assembly design) in a parametric form. As such, a representation of a partial parametric form can be $X_{partial}=\{x_{1:D}\}\in(\mathbb{R}\cup\emptyset)^{D}$, where $x_i$ is either missing, categorical, or numerical. If $x_i$ is categorical, then valid ranges can be $c_1, \ldots, c_c$, where $c_i$ denotes the categories and C is the categories for a feature. Thus, the estimation system 100 autocompletes the partial parameters 150 through finding $F_{autocomplete}:X_{partial}\rightarrow X_{full}$ such that $X_{full}$ is diverse with numerous recommendations for a completed object.

For additional robustness, the estimation system 100 can execute computations for finding:

$$P_{missing|Observed}=P(m_1, \ldots, o_M\in M\mid o_1, \ldots, o_O\in O). \quad \text{Equation (1)}$$

Here, M is the set of missing features and denoted by $M=\{m_i\in X_{partial}: m_i=\emptyset\}$. O is the set of observed, defined, etc., parameters and denoted by $O=\{o_i\in X_{partial}: o_i\in\mathbb{R}\}$. Measuring task performance for imputation by the completion pipeline 300 can involve computing the Root Mean Square Error (RMSE). For numerical features, the RMSE can be calculated as:

$$RMSE(X_{test}) = \frac{1}{N_{test}}\sum_{i=1}^{N_{test}}\sqrt{\frac{\sum_{j=1}^{M_i}\left(\hat{x}_i^j - y_i^j\right)^2}{M_i}}. \quad \text{Equation (2)}$$

Here, $N_{test}$ is the number of test samples and $M_i$ is missing numerical features for sample i.

$$\hat{x}_i^j$$

is imputation prediction for missing feature j of sample i by the completion pipeline 300. Furthermore, $$y_i^j$$

is the dataset value for missing feature j of sample i and represents a target design for a testing sample.

Comparing model performance in imputing categorical features can involve computing error rates as:

$$Err(X_{test}) = \frac{1}{N_{test}}\frac{1}{M_i}\sum_{i=1}^{N_{test}}\sum_{j=1}^{M_i}\mathbb{1}\left[\hat{x}_i^j \neq y_i^j\right]. \quad \text{Equation (3)}$$

Here, $N_{test}$ is the number of test samples. $M_i$ is the number of missing categorical features for sample i and $\mathbb{1}$ is an indicator function. Furthermore, $$y_i^j$$

is the dataset value for missing feature j of sample i and represents a target design for a testing sample.

Diversity of outputs imputed and generated by the completion pipeline 300 can be measured through (a) a diversity score to measure coverage, and (b) Kullback-Leibler (KL)-Divergence from distributions of generated features when compared to a dataset that measures data representativeness. For example, the diversity score is computed as:

$$\text{Diversity}(X_{test}) = \frac{1}{N_{test}}\frac{1}{M_i}\sum_{i=1}^{N_{test}}\sum_{j=1}^{M_i}\max_{k\neq l}\sqrt{(S_{k,j} - S_{l,j})^2}. \quad \text{Equation (4)}$$

Here, l and k are the indices of the samples obtained by the generative model and $S_{k,j}$ and $S_{l,j}$ are the k-th and l-th sampled value for missing feature j. The diversity score finds the average maximum distance between missing features, parameter gaps, missing parameters, etc. The diversity score factors that some missing features can exhibit constrained correct values while others have a large variation. In one approach, the estimation system 100 considers features that have a mean correlation value that is greater than the median among features of the dataset that are primarily factored when calculating the diversity score.

Still referring to FIG. 3, the completion pipeline 300 can accept the partial parameters 150 and an assembly graph about an object from a computing task (e.g., design, ideation, testing, etc.). The completion pipeline 300 constructs a parameter graph 310 having details that accurately describe features and interdependencies between features for the object. The estimation system 100 can derive these insights from the assembly graph conditioned with the partial parameters 150. For example, the object is a bike and the computing task is designing a new bike. Here, the partial parameters 150 can describe features of the bike (e.g., color, mountain, etc.) and the assembly graph describes couplings between different components of the bike (e.g., handlebar, wheels, seat, etc.). Furthermore, the generation module 130 can create a graph embedding from encoding the parameter graph 310 using a learning model 340 (e.g., a GNN, a GCN, etc.). Here, the learning model 340 can train by minimizing losses such that the graph embedding includes nuanced features about the object and accurately represents the structural relationships between object components. In this way, the completion pipeline 300 efficiently executes the computing task through a structure and organization of the graph embedding.

Moreover, a feature tokenizer 320 and a positional encoder 330 translate parametric and spatial information into a tokenized format representing embeddings. Here, the feature tokenizer 320, the positional encoder 330, and the learning model 340 can execute information in parallel, serially, etc., such as according to the complexity of the computing task. In one approach, the feature tokenizer 320 derives a parametric embedding from the assembly graph. An embedding can be one of a vector (e.g., flow tensors) and a number array that represent features about the object using various values (e.g., −1 to 1) and a simple format. Furthermore, the positional encoder 330 computes a positional embedding from the assembly graph. The positional embedding can include positional information of features within the object and relational context about object features. For instance, features about a handlebar positioned proximate to a bike frame include related information (e.g., size, connection type, etc.).

As further explained below, a cross-attention model 350 can estimate a conditional embedding that is multi-modal using the graph embedding, the parametric embedding, and the positional embedding. A cross-attention network can be a neural network processing multiple sequences of data for identifying relevant relationships and focus areas. In one approach, an input is a "query" sequence (e.g., a textual input) and another sequence is a "key" sequence defining context, additional information, etc. By selectively focusing on relevant parts of the key sequence while processing elements of the query sequence, the network generates more accurate and contextually important outputs. Here, the cross-attention model 350 selects structural context and information about the object that is relevant within the embeddings. As such, the cross-attention model 350 can intelligently focus upon and fuse applicable data for other computing tasks to complete the partial parameters 150. The output of the cross-attention model 350 is a conditional embedding that is multi-modal through incorporating different input categories and types. The output can be conditional since the completion pipeline 300 begins processes using existing information with the partial parameters 150 and the assembly graph rather than random data.

Additionally, the completion pipeline 300 can also include a denoising model 360 (e.g., diffusion-based denoising) to accurately impute the partial parameters 150 from the multi-modal conditional embedding. As previously explained, denoising can use forward-diffusion for injecting noise into the partial parameters 150 and the assembly graph completing the partial parameters 150. Here, the denoising model 360 can extract features from the partial parameters 150 and the assembly graph having injected noise. As previously explained, a network can interpret outputs from the denoising model 360 for completing the partial parameters 150. Furthermore, the completion pipeline 300 can include the rendering engine 370 (e.g., a computer-aided design (CAD) engine) that generates various objects having diverse properties using completed parameters. The parameters for the objects generated by the completion pipeline 300 can be further modified upon evaluation 380 leading to additional gaps, missing values, etc., for the partial parameters 150. In other words, the evaluation 380 is feedback for iterations and refinement of generated objects. Accordingly, the completion pipeline 300 facilitates the generation of accurate and detailed objects that bridge the gap between partial information and complete realization.

Regarding details about constructing the parameter graph 310 from an assembly graph and the partial parameters 150, the completion pipeline 300 may categorize features. For example, the completion pipeline 300 categorizes features into 11 distinct components in Table 1 for a bike. The completion pipeline 300 can translate the components in Table 1 into a tabular form that simplifies computations. Although Table 1 references a bike, the completion pipeline 300 can complete the partial parameters 150 for any object during a computing task as understood by one of ordinary skill in the art.

Regarding graphing structure, node features within the parameter graph 310 can be concatenated features for components within the assembly graph 400 and modified as specified by the partial parameters 150. In one approach, missing features, parameters, etc., have a value of 0 that preserve feature sizes. An edge that is weighted exists between nodes when corresponding components are physically coupled, interact, etc., within a bike structure. For instance, a weight having 0 value indicates unrelated components while a weight having 1 value indicates related components. As such, the assembly graph 400 delineates component relationships and allows the learning model 340 to process partial parameters 150 while maintaining natural connectivity and dependency between different parts. Thus, the learning model 340 accurately captures and encodes complex interplay of components, thereby facilitating completed parameters across distributions that are more nuanced and informed during generative computations.

Regarding details about estimating a conditional embedding of a graph embedding and the assembly graph 400, the feature tokenizer 320 may have fully connected layers that process and encode numerical features and output the parametric embedding. In one approach, the feature tokenizer 320 has an embedding layer that is dedicated and implemented for the categorical features so that each feature type is optimally represented. Furthermore, the positional encoder 330 captures spatial aspects of the assembly graph 400 through encoding positional information about features. In this way, the positional encoder 330 focuses upon relational context found in tabular data such that features positioned closely are likely to convey related information. Furthermore, the cross-attention model 350 may fuse embeddings into a multi-modal representation using an embedding derived from the assembly graph 400 with those generated by the feature tokenizer 320 and the positional encoder 330. As such, the cross-attention model 350 effectively integrates structural, categorical, and spatial dimensions of data into a conditional embedding that is singular and multi-modal. The integrated embeddings capture both intrinsic properties and interrelations of features within the assembly graph 400, thereby improving diffusion and denoising for completion.

TABLE 1

| Component | Features |
|---|---|
| Seat Tube | Seat tube length, Seat tube extension2, Seat tube diameter, Seatpost setback, Seatpost LENGTH, Stack, Lower stack height, Upper stack height |
| Head Tube | Head tube upper extension2, Head angle, Head tube lower extension2, Head tube diameter |
| Top Tube | Top tube rear diameter, Top tube front diameter |
| Down Tube | Down tube front diameter, Down tube rear diameter |
| Chain Stay | CHAINSTAYAUXrearDIAMETER, Chain stay horizontal diameter, Chain stay position on BB, Chain stay taper, Chain stay back diameter, Chainstay vertical diameter |
| Seat Stay | Seat stay junction0, Seat stay bottom diameter, SEATSTAY_HF, SEATSTAY_HR, SEATSTAYTAPERLENGTH |
| Fork | FORK10R, FORK0L |
| Saddle | Saddle P, Saddle thickness, Saddle angle, Saddle J, Saddle H, Saddle E, SADDLETIPtoMIDDLE, Saddle length |
| Wheel | Wheel width rear, Wheel width front, Wheel diameter front, Wheel diameter rear, SPOKES composite front, SPOKES front, SPOKES rear, SPOKES composite rear, ERD rear, ERD front |
| Handle | Road bar reach, Road bar drop, Brake lever position, Bullhorn angle, HBAREXTEND, Handlebar angle, MtnBar angle, HBARTHETA, Pedal width, Stem angle, Stem length |
| BB | BB textfield, BB length, BB diameter |

Figure 4A:
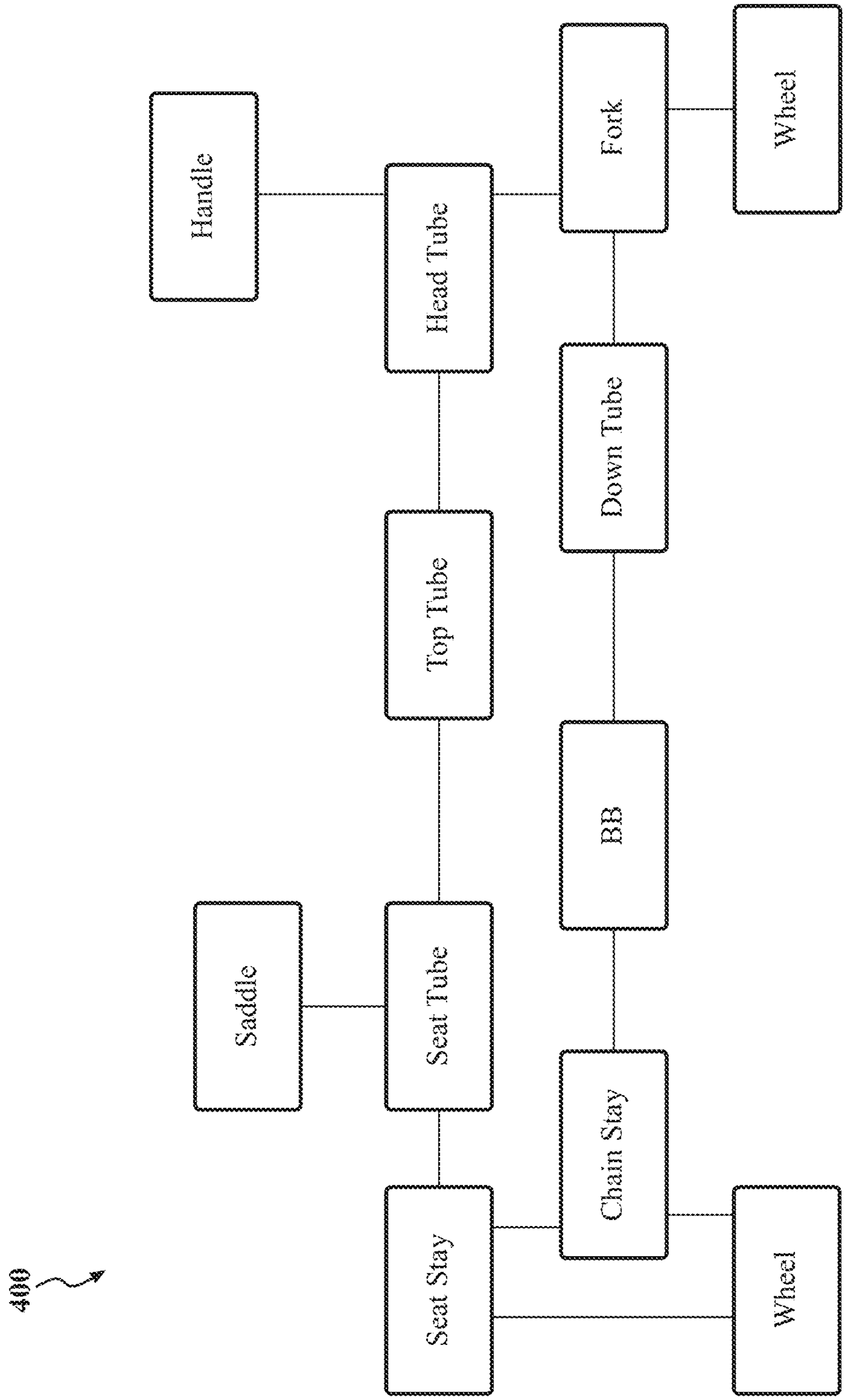
FIGS. 4A and 4B illustrate examples of classifications for an assembly graph and automatically completing partial designs.
Figure 4B:
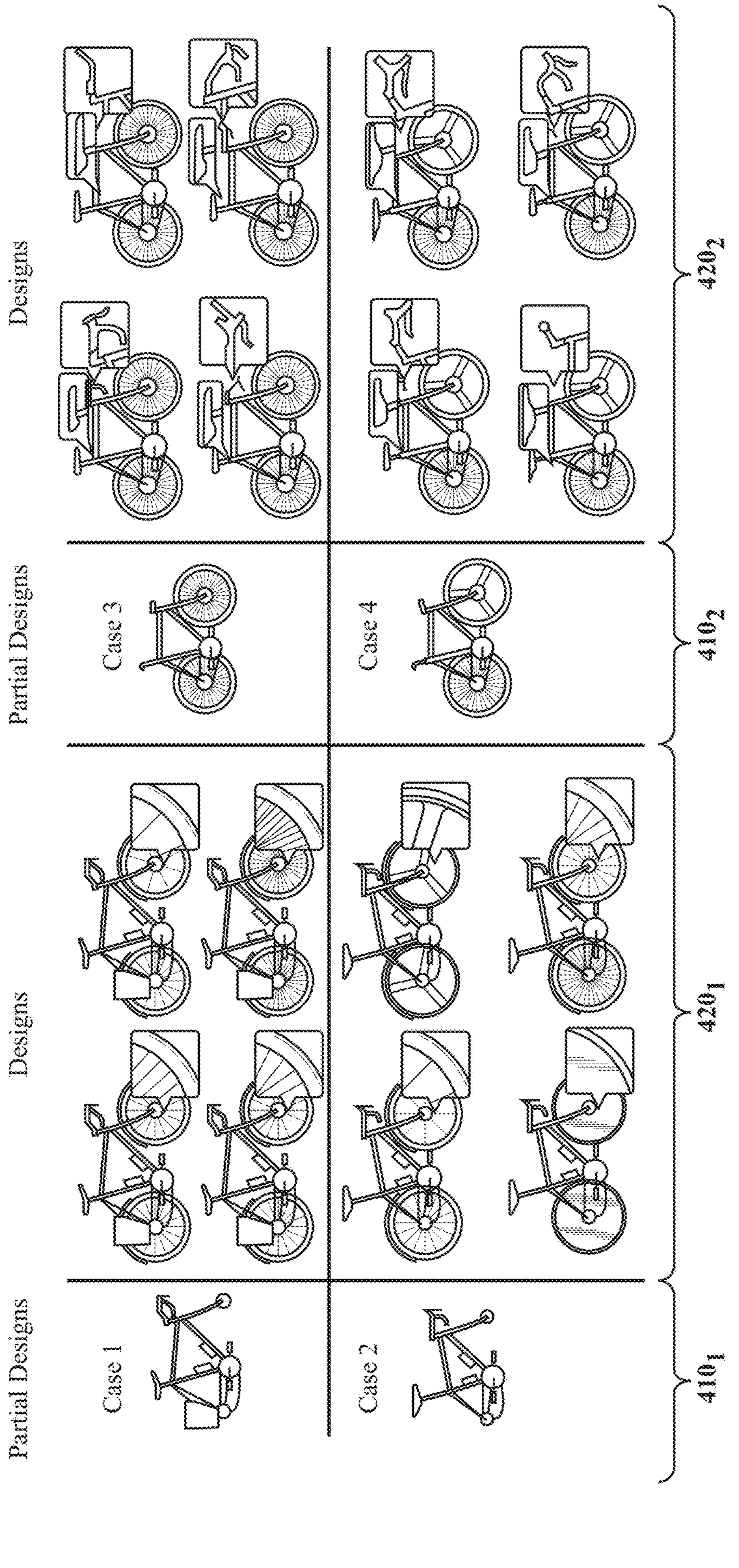

Now referring to FIGS. 4A and 4B, examples of classifications for an assembly graph 400 and automatically completing partial designs are illustrated. The assembly graph 400 delineates a structural and relational framework of the bike components. For example, a saddle is structurally coupled to a seat tube but not the seat stay. However, the seat tube is structurally coupled to the seat stay and the top tube. The completion pipeline 300 can utilize the partial parameters 150 and the assembly graph 400 for systematically constructing the parameter graph 310 in a feature-specific manner. This allows the learning model 340 (e.g., a GNN, GCN, etc.) to output encodings of object features that are context-aware through interconnections and architecture represented within the parameter graph 310. In this way, the completion pipeline 300 ensures that the learning model 340 has a detailed understanding of object structure that facilitates accurate feature imputation and encoding.

In one embodiment, the denoising model 360 completes the partial parameters 150 using the conditional embedding. Here, the conditional embedding can represent a multi-modal embedding vector enriched with the assembly graph 400, a parametric embedding, and a positional embedding. The denoising model 360 can automatically generate the missing parameters through a diffusion operation that ensures both diversity and accuracy of completed objects.

Moreover, FIG. 4B shows visualization from a rendering pipeline that transforms the object into various forms using a parametric set that is completed and outputted from the completion pipeline 300. Here, the partial designs 4101 of speed bikes having the partial parameters 150 are automatically completed as designs 4201 exhibiting various wheel types. The designs 4201 exhibit diverse variations for wheel types generated from graph-based learning, multi-modal attention networks, and the denoising model 360. Similarly, the partial designs 4102 of mountain bikes having the partial parameters 150 are automatically completed as designs 4202 that have diverse variations and life-like properties. The designs 4202 have multi-faceted outputs for seats and handlebars. Accordingly, the completion pipeline 300 mimics human design through outputting completed objects along precise partial parameters while having individualized qualities.

Figure 5:
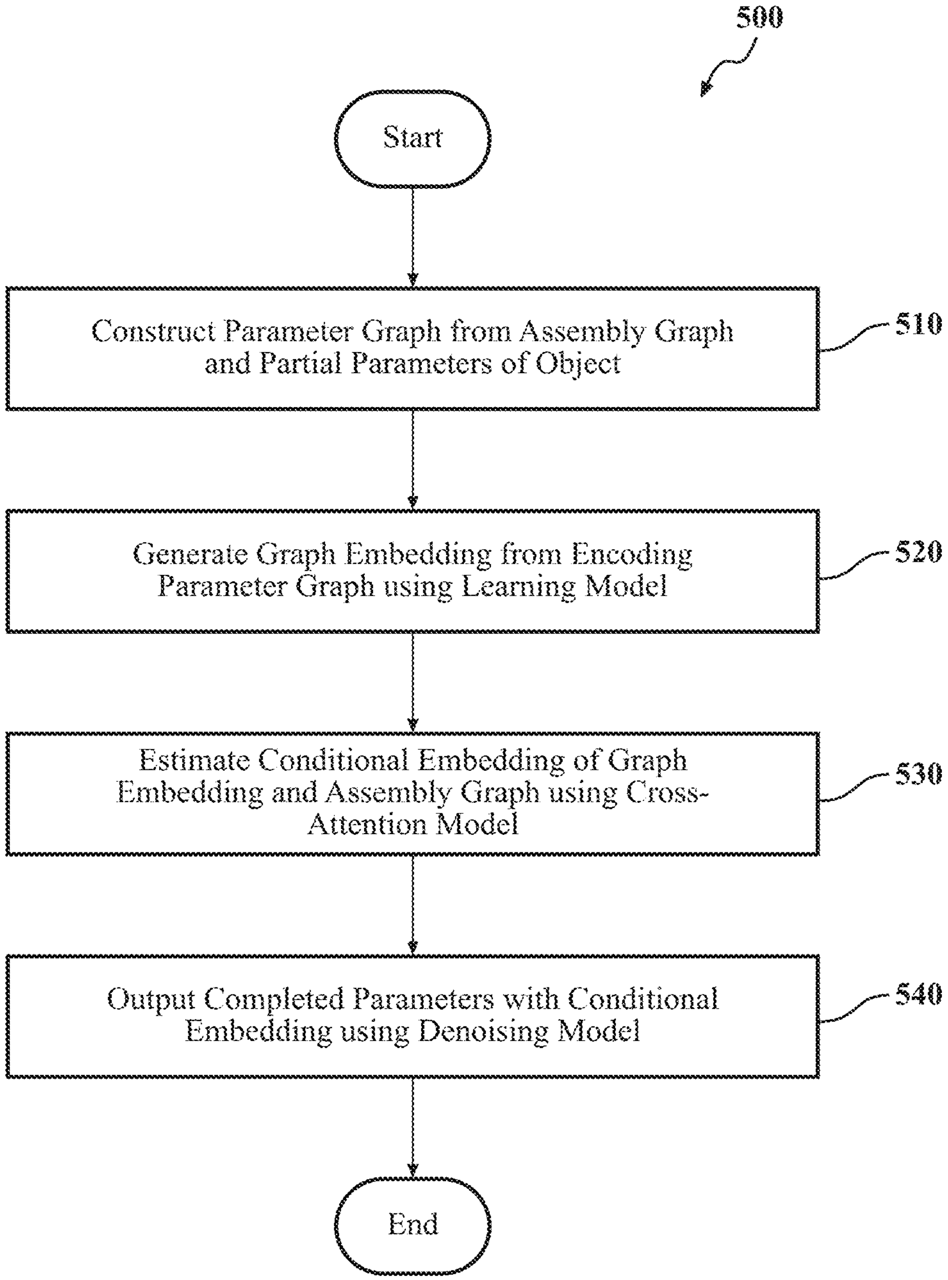
FIG. 5 illustrates one embodiment of a method that is associated with estimating a conditional embedding from partial parameters and an assembly graph using the cross-attention model and automatically completing parameters using a denoising model.

Now discussing FIG. 5, one embodiment of a method that is associated with estimating a conditional embedding from partial parameters and an assembly graph using a cross-attention model and automatically completing parameters using a denoising model is illustrated. Method 500 will be discussed from the perspective of the estimation system 100 of FIG. 1. While the method 500 is discussed in combination with the estimation system 100, it should be appreciated that the method 500 is not limited to being implemented within the estimation system 100 but is instead one example of a system that may implement the method 500.

The method 500 accurately imputes missing data and generates objects that are diverse and realistic using the estimation system 100. Furthermore, the diffusion of embeddings derived from the partial parameters 150 and an assembly graph promotes the exploration and creativity of atypical objects through spreading information across multi-domains using injected noise. In one approach, the method 500 also generates coherent objects from weakly correlated features and relational cues that are minimal from the partial parameters 150 and an assembly graph about the object, thereby exhibiting system robustness.

At 510, the estimation system 100 constructs a parameter graph from an assembly graph and the partial parameters 150 of an object for a computing task (e.g., object design, testing, etc.). Here, the assembly graph can interrelate components and features about an object in a manner that reduces computational costs and improves accuracy when completing the partial parameters 150. As previously explained, the assembly graph also can have edges connecting nodes that are coupled, structurally related, etc. Furthermore, the partial parameters 150 can be design features and a category about the object during a design task, a computing task, etc., that involves completing the object through generative computing.

Constructing the parameter graph can involve forming a graph having details that accurately describe features and feature interdependencies for the object. Furthermore, the parameter graph can have nodes representing concatenated features for object components. Concatenated features can include missing values resulting from the partial parameters 150. For example, the object is a vehicle and the computing task is designing a new vehicle. Here, the partial parameters 150 can describe vehicle features (e.g., color, sports car, big wheels, etc.) and the assembly graph describes couplings between different components of the vehicle (e.g., wheels, fenders, bumper, etc.). Node features within the parameter graph can be concatenated features for components within the assembly graph. An edge exists between nodes when corresponding components are physically coupled, interact, etc., within a vehicle structure. The edges can indicate relations between components using weights. In this way, the assembly graph delineates component relationships and allows the learning model 340 to process partial parameters 150 represented through the parameter graph while maintaining natural connectivity and dependency between object parts.

At 520, the generation module 130 generates a graph embedding from encoding the parameter graph using a learning model (e.g., a GCN, a GNN, etc.). An embedding may be one of a vector and a number array that represent features about the object. In one approach, the learning model captures nuanced interdependencies between the partial parameters 150 and context awareness derived from graphing using the assembly graph. In this way, the estimation system 100 increases insights for generating diverse objects through feature representations within the graph embedding.

At 530, the estimation system 100 estimates the conditional embedding 160 of the graph embedding and the assembly graph using a cross-attention model. The conditional embedding 160 may be a vector, a number array, etc., that represent features about the object. As previously explained, a conditional computation can involve controlling and directing calculations through adding supplemental variables, such as the partial parameters. In one approach, the cross-attention model selects structural context and information about the object that is relevant within embeddings derived from inputted data. The conditional embedding is singular and multi-modal through combining the graph embedding and information derived from the assembly graph. For example, operations include executing a feature tokenizer that encodes numerical features from the assembly graph and outputs a parametric embedding having a simple format for reducing computational costs. Furthermore, a positional encoder captures spatial aspects of the assembly graph through encoding positional information about features. In this way, the positional encoder focuses upon relational context when the partial parameters are in tabular form such that features positioned closely may convey related information.

In various implementations, the cross-attention model fuses embeddings from the assembly graph, the feature tokenizer, and the positional encoder. As such, the cross-attention model effectively integrates structural, categorical, and spatial dimensions of data into a conditional embedding that is multi-modal and completely represents the data. The integrated embeddings also exploit and capture both intrinsic properties and interrelations about features within the assembly graph.

At 540, the estimation system 100 outputs completed parameters with the conditional embedding using a denoising model. For example, the denoising model uses diffusion to accurately impute the partial parameters 150 from the conditional embedding as directed by the computing task. Here, denoising can involve a forward-diffusion block that injects noise into the partial parameters 150 and the assembly graph. Forward-diffusion can propagate inputs outward through interconnected nodes for mimicking trend dissemination in a directional manner. Noise can be injected using random errors during propagation for simulating real-world uncertainties. The partial parameters 150 are denoised for imputation and completed by a decoder network.

Moreover, the estimation system 100 can include a rendering engine (e.g., a computer-aided design (CAD) engine) that generates various objects having diverse properties using completed parameters. The parameters for the objects generated by the estimation system 100 can be further modified using feedback. This leads to additional gaps, missing values, etc., for the partial parameters 150 and opportunities for refining outputs from a computing task. In this way, the estimation system 100 accurately captures and reproduces complex interdependencies between different design parameters generating results that are real-world. Therefore, the estimation system 100 outputs viable options that are numerous and diverse for incomplete inputs, thereby facilitating increased exploration and depth for generative tasks.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:
a memory storing instructions that, when executed by a processor, cause the processor to:
construct a parameter graph from an assembly graph and partial parameters associated with an object;
generate a graph embedding from encoding the parameter graph using a learning model;
estimate a conditional embedding of the graph embedding and the assembly graph using a cross-attention model; and
output completed parameters with the conditional embedding using a denoising model and complete the object with the completed parameters.

2. The estimation system of claim 1, wherein the instructions to estimate the conditional embedding further include instructions to:
derive a parametric embedding from the assembly graph using a feature tokenizer;
compute a positional embedding from the assembly graph using a positional encoder; and
fuse the graph embedding, the parametric embedding, and the positional embedding using the cross-attention model.

3. The estimation system of claim 2, wherein the positional embedding includes positional information of features within the object and relational context from tabular data about the object, and the features positioned proximately include related information.

4. The estimation system of claim 2, wherein the instructions to fuse the graph embedding further include instructions to:
select by the cross-attention model portions of the graph embedding, the parametric embedding, and the positional embedding according to structural context.

5. The estimation system of claim 1, wherein:
the assembly graph comprises edges that connect nodes being structurally related; and
the parameter graph comprises the nodes having concatenated features of a component associated with the object, the concatenated features include missing values, and the edges and the nodes are altered using the partial parameters.

6. The estimation system of claim 1, wherein the instructions to complete the object further include instructions to:
render an image of the object using the completed parameters.

7. The estimation system of claim 1, wherein the graph embedding and the conditional embedding are one of a vector or a number array that represent features about the object.

8. The estimation system of claim 1, wherein the denoising model is a diffusion-denoising model and the learning model is a graph neural network (GNN).

9. The estimation system of claim 1, wherein the partial parameters describe one of design features or a category about the object.

10. A non-transitory computer-readable medium comprising:
instructions that when executed by a processor cause the processor to:
construct a parameter graph from an assembly graph and partial parameters associated with an object;
generate a graph embedding from encoding the parameter graph using a learning model;
estimate a conditional embedding of the graph embedding and the assembly graph using a cross-attention model; and
output completed parameters with the conditional embedding using a denoising model and complete the object with the completed parameters.

11. The non-transitory computer-readable medium of claim 10, wherein the instructions to estimate the conditional embedding further include instructions to:
derive a parametric embedding from the assembly graph using a feature tokenizer;
compute a positional embedding from the assembly graph using a positional encoder; and
fuse the graph embedding, the parametric embedding, and the positional embedding using the cross-attention model.

12. A method comprising:
constructing a parameter graph from an assembly graph and partial parameters associated with an object;
generating a graph embedding from encoding the parameter graph using a learning model;
estimating a conditional embedding of the graph embedding and the assembly graph using a cross-attention model; and
outputting completed parameters with the conditional embedding using a denoising model and completing the object with the completed parameters.

13. The method of claim 12, wherein estimating the conditional embedding further includes:
deriving a parametric embedding from the assembly graph using a feature tokenizer;
computing a positional embedding from the assembly graph using a positional encoder; and
fusing the graph embedding, the parametric embedding, and the positional embedding using the cross-attention model.

14. The method of claim 13, wherein the positional embedding includes positional information of features within the object and relational context from tabular data about the object, and the features positioned proximately include related information.

15. The method of claim 13, wherein fusing the graph embedding further includes:
selecting by the cross-attention model portions of the graph embedding, the parametric embedding, and the positional embedding according to structural context.

16. The method of claim 12, wherein:
the assembly graph comprises edges that connect nodes being structurally related; and
the parameter graph comprises the nodes having concatenated features of a component associated with the object, the concatenated features include missing values, and the edges and the nodes are altered using the partial parameters.

17. The method of claim 12, wherein completing the object further includes:
rendering an image of the object using the completed parameters.

18. The method of claim 12, wherein the graph embedding and the conditional embedding are one of a vector or a number array that represent features about the object.

19. The method of claim 12, wherein the denoising model is a diffusion-denoising model and the learning model is a graph neural network (GNN).

20. The method of claim 12, wherein the partial parameters describe one of design features or a category about the object.

* * * * *